United States Patent [19]

Bezborodov et al.

[11] Patent Number: 4,683,079
[45] Date of Patent: Jul. 28, 1987

[54] LIQUID-CRYSTAL 4-N-PENTYLPHENYL ESTERS OF 4'-(TRANS-4''-N-ALKYLCYCLOHEX-2-ENOYLOXY)BENZOIC ACIDS

[76] Inventors: Vladimir S. Bezborodov, ulitsa Vasnetsova, 53; Viktor A. Konovalov, ulitsa Yakubova, 66, Korpus 4, kv. 26; Jury L. Ptashnikov, ulitsa Pushkina, 64, kv. 241; Vladimir M. Astafiev, ulitsa Malinina, 34, kv. 460; Alexandr E. Petrovich, ultisa V. Khoruzhei, 46, korpus 1, kv. 55, all of Minsk, U.S.S.R.

[21] Appl. No.: 885,574
[22] PCT Filed: Nov. 14, 1984
[86] PCT No.: PCT/SU84/00062
§ 371 Date: Jun. 20, 1986
§ 102(e) Date: Jun. 20, 1986
[87] PCT Pub. No.: WO86/02925
PCT Pub. Date: May 22, 1986
[51] Int. Cl.[4] .................. C09K 19/20; C09K 19/06; C07C 65/03; C07C 65/105; C07C 51/15
[52] U.S. Cl. .............. 252/299.67; 252/299.6; 350/350 R; 560/73; 560/128
[58] Field of Search ........... 252/299.6, 299.67, 299.64, 252/299.5; 350/350 R, 350 S; 560/73, 128

[56] References Cited

U.S. PATENT DOCUMENTS

| | | | |
|---|---|---|---|
| 4,011,173 | 3/1977 | Steinstrasser | 252/299.64 |
| 4,113,647 | 9/1978 | Coates et al. | 252/299.63 |
| 4,211,666 | 7/1980 | Inukai et al. | 252/299.6 |
| 4,293,434 | 10/1981 | Deutscher et al. | 252/299.63 |
| 4,368,135 | 1/1983 | Osman et al. | 252/299.63 |
| 4,505,837 | 3/1985 | Romer et al. | 252/299.5 |
| 4,565,425 | 1/1986 | Petrzilka et al. | 252/299.63 |
| 4,605,510 | 8/1986 | Bezdorodov et al. | 252/299.66 |
| 4,605,520 | 8/1986 | Bezborodov et al. | 252/299.66 |
| 4,629,581 | 12/1986 | Boller et al. | 252/299.63 |

FOREIGN PATENT DOCUMENTS

| | | | |
|---|---|---|---|
| 2078727 | 1/1982 | United Kingdom | 252/299.6 |
| 920062 | 4/1982 | U.S.S.R. | 252/299.63 |

OTHER PUBLICATIONS

Deutscher, H. J., et al., Journal F. Prakt. Chemie, vol. 321, No. 1, pp. 47–64 (1979).
Demus, D., et al., Flüssige Kristalle in Tabellen II, VEB Deutscher Verlag Fur Grumastoff Industrie, Leipzig, pp. 79–82, 44–46, 172 (1984).

*Primary Examiner*—Teddy S. Gron
*Attorney, Agent, or Firm*—Burgess, Ryan & Wayne

[57] ABSTRACT

Liquid crystal 4-n-pentylphenyl esters of 4'-(trans-4''-n-alkylcyclohex-2-enoyloxy(benzoic acids of the general formula:

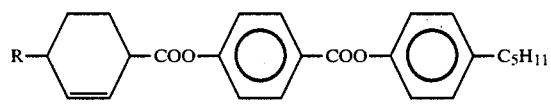

wherein R is $C_2H_5$, n—$C_3H_7$.

1 Claim, No Drawings

LIQUID-CRYSTAL 4-N-PENTYLPHENYL ESTERS OF 4'-(TRANS-4''-N-ALKYLCYCLOHEX-2-ENOYLOXY)BENZOIC ACIDS

FIELD OF THE INVENTION

The present invention relates to novel liquid crystal compounds which can be useful as components of liquid crystal compositions for electrooptical devices for presentation of information.

PRIOR ART

Known in the art are liquid crystal 4-n-alkylphenyl esters of 4'-(4''-n-alkylbenzoyloxy) benzoic acids (Journal für praktische Chemie, Band 321, 1979, J. A. Barth, Leipzig; H. J. Deutscher, C. Seidel, M. Körber, H. Schubert "Synthese und mesomorphe Eigenschaften von 4-[trans-4-n-Alkylcyclohexanoyloxy]-benzoesaurephenyl-und-4-Benzoyloxybenzoesäure-cyclohexyl-estern", S. 59–60).

A disadvantage of these compounds resides in that they have a high temperature of the formation of a liquid-crystal (nematic) phase (not below 76° C.) which restricts their application as components of liquid-crystal compositions exhibiting low temperatures of the formation of liquid crystal phases.

Another analog of the compounds according to the present invention are 4-n-alkylphenyl esters of 4'-(trans-4''-n-alkylcyclohexanoyloxy)benzoic acids. The temperature of the formation of the liquid crystal phase of these compounds is not below 65° C. (see the same reference, p. 49–52). These compounds have the same disadvantages as 4-n-alkylphenyl esters of 4'-(4''-n-alkylbenzoyloxy)benzoic acids.

DISCLOSURE OF THE INVENTION

The present invention is directed to the provision of novel liquid crystal compounds with a low temperature of the formation of a liquid crystal (nematic) phase, with a wide temperature range of the existence of this phase which can be useful as components of a liquid crystal composition featuring a low temperature of the formation of a liquid-crystal phase and intended for electrooptical devices for presentation of information.

This object is accomplished by novel liquid crystal compounds—4-n-pentylphenyl esters of 4'-(trans-4''-alkylcyclohex-2-enoyloxy)benzoic acids of the general formula:

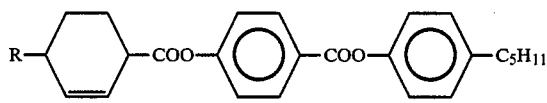

wherein R is $C_2H_5$, n—$C_3H_7$.

The compounds according to the present invention have a low temperature of the formation of a liquid crystal (nematic) phase (for example, 48° C.), a broad range of existence of this phase (for example, 118° C.), feature a good miscibility with various classes of liquid crystal materials.

This enables a successful use of the liquid crystal compounds according to the present invention as components of a liquid-crystal composition intended for electrooptical devices for presentation of information.

BEST MODE FOR CARRYING OUT THE INVENTION

The liquid crystal compounds according to the present invention are obtained by a known reaction, namely by reacting chlorides of trans-4-n-alkylcyclohex-2-enecarboxylic acids with 4-n-pentylphenyl ester of 4-hydroxybenzoic acid in the presence of pyridine.

A process for producing these liquid crystals compounds resides in that a mixture of 0.3 mol of trans-4-n-alkylcyclohex-2-enecarboxylic acid (wherein an alkyl is $C_2H_5$, n—$C_3H_7$), 0.4 mol of thionyl chloride, 0.5 mol of pyridine in an anhydrous diethyl ether is stirred for 1.5 hour. Then the mixture is added with 0.3 mol of 4-n-pentylphenyl ester of 4'-hydroxybenzoic acid and 0.5 mol of pyridine. The mixture is maintained at room temperature for 12 hours. Thereafter the ethereal solution of the desired product is washed with water, dried with anhydrous sodium sulphate. The residue obtained after distilling-off the solvent is recrystallized from isopropanol. The yield of the desired product is equal to 46–50% of the amount of the acid employed.

The synthesized compounds comprise white odourless substances at room temperature.

Gross formulae of the resulting compounds have been proven by the results of elemental analysis (see the Table hereinbelow), as well as by data of IR- and PMR-spectra.

Intensive absorption bands of 1,705; 1,725 $cm^{-1}$ in IR spectra correspond to stretching vibrations of carbonyls of ester groups. Signals within the range of 6.93–8.43, 5.71, 3.27 ppm in PMR spectra belong to protons of aromatic rings, double-bond protons and to the proton attached to the first carbon atom of the cyclohexene ring.

TABLE

| No. | Compounds of the present invention of the above general formula, wherein R is | Temperature range of the existence of the liquid crystal phase, °C. |
|---|---|---|
| 1 | $C_2H_5$ | 50.5–134 |
| 2 | n-$C_3H_7$ | 48–166 |

| No. | Found, %: C | H | Gross formula | Calculated, %: C | H |
|---|---|---|---|---|---|
| 1 | 77.18 | 7.51 | $C_{27}H_{31}O_4$ | 77.32 | 7.39 |
| 2 | 77.83 | 7.60 | $C_{28}H_{33}O_4$ | 77.59 | 7.62 |

As it is seen from the Table, the compounds according to the present invention have low temperatures of the formation of a liquid-crystal phase (for example, 48° C.), a wide temperature range of the existence of this phase (for example, 118° C.).

This enables a successful use of the liquid crystal compounds according to the present invention as components of a liquid-crystal composition intended for electrooptical devices for presentation of information which, in contrast to compositions based on the above-mentioned prior art compounds has a lower temperature of the formation of a liquid crystal phase.

Thus, a liquid-crystal composition consisting of 74 mol.% of 4-n-pentyl-4'-cyanodiphenyl and 26 mol.% of 4-n-pentylphenyl ester of 4'-(trans-4''-ethylcyclohex-2-enoyloxy)benzoic acid has the temperature of the formation of a liquid crystal (nematic) phase of 5° C., while a composition consisting of 77 mol.% of 4-n-pentyl-4'-cyanodiphenyl and 23 mol.% of 4-n-butylphenyl ester of 4'-(trans-4''-n-propylcyclohexanoyloxy)benzoic acid has the temperature of the formation of this phase of 14° C.

Therefore, the liquid crystal 4-n-pentylphenyl esters of 4'-(trans-4''-n-alkylcyclohex-2-enoyloxy)-benzoic acids according to the present invention as compared to the prior art compounds feature lower temperatures of the formation of a liquid crystal (nematic) phase, a wider temperature range of the existence of this phase which makes it possible to use them as components of a composition intended for electrooptical devices for presentation of information and characterized by a low temperature of the formation of the liquid crystal phase.

INDUSTRIAL APPLICABILITY

The present invention is useful in electronic watch, microcalculators, digital visual information tableaux and other electrooptical devices for presentation of information.

We claim:

1. Liquid crystal 4-n-pentylphenyl esters of 4'-(trans-4''-n-alkylcyclohex-2-enoyloxy)benzoic acids of the general formula:

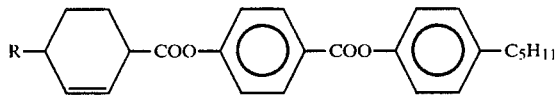

wherein R is $C_2H_5$, n—$C_3H_7$.

* * * * *